United States Patent [19]

Perloff et al.

[11] Patent Number: 4,984,251
[45] Date of Patent: Jan. 8, 1991

[54] METHOD AND APPARATUS FOR THE SYNCHRONIZATION OF A CASCADED MULTI-CHANNEL DATA TRANSMISSION

[75] Inventors: Ronald S. Perloff, Poway, Calif.; James R. Hamstra, Shorewood, Minn.; Gabriel M. Li, San Francisco; Louise Y. Y. Yeung, Sunnyvale, both of Calif.

[73] Assignee: National Semiconductor Corporation, Santa Clara, Calif.

[21] Appl. No.: 394,445

[22] Filed: Aug. 16, 1989

[51] Int. Cl.$^5$ ............................................... H04K 1/10
[52] U.S. Cl. ...................................... 375/38; 375/107; 371/1
[58] Field of Search ................. 375/38, 40, 106, 107, 375/108; 455/607, 608; 370/100, 103, 105, 105.4; 371/1; 364/131

[56] References Cited

U.S. PATENT DOCUMENTS

| | | | |
|---|---|---|---|
| 3,310,741 | 3/1967 | Vitermark et al. | 375/38 |
| 3,961,368 | 6/1976 | Herbst et al. | 375/38 |
| 4,688,210 | 8/1987 | Eizenhofer et al. | 370/100 |
| 4,696,019 | 9/1987 | Tulpule et al. | 375/106 |
| 4,797,951 | 1/1989 | Duxbury et al. | 375/38 |
| 4,809,302 | 2/1989 | Richman et al. | 375/107 |
| 4,825,451 | 4/1989 | Schwartz | 375/38 |

Primary Examiner—Douglas W. Olms
Assistant Examiner—Stephen Chin
Attorney, Agent, or Firm—Limbach, Limbach & Sutton

[57] ABSTRACT

A method and apparatus for synchronizing the cascaded, multi-channel transmission of a plurality of data characters is provided. Each sequence of data characters preceded by a start delimiter. Each transmission channel provides transmitted data frames to an associated elasticity buffer. As each channel detects a start delimiter, it asserts a begin-request signal that acknowledges detection of the start delimiter. When all channels have detected a start delimiter, a read-start signal is asserted to simultaneously advance the read pointer of each elasticity buffer. In this manner, each elasticity buffer initiates a sunchronized read for local use or retransmission of the multi-channel data.

6 Claims, 2 Drawing Sheets

METHOD AND APPARATUS FOR THE SYNCHRONIZATION OF A CASCADED MULTI-CHANNEL DATA TRANSMISSION

BACKGROUND OF THE INVENTION

1. Field of the Invention

The present invention relates to data transmission networks and, in particular, to a method and apparatus for synchronization of cascaded multi-channel data transmissions between stations on a data transmission network by simultaneously initiating the retrieval of data from each transmission channel's elasticity buffer.

2. Discussion of the Prior Art

Communications between stations on a data transmission network occur through the transmission of a sequence, or "frame", of data characters. Adjacent frames are separated by characters that define an interframe gap and are distinguished from one another through the use of start and end delimiters. These delimiters may be either implicit or explicit. For example, a receiving station can implicitly establish the beginning and end of each frame by identifying transitions from no data characters to data characters and from data characters to no data characters, respectively. In other systems, the receiving station may rely on the use of a unique start code pattern and a unique stop code pattern to identify the exact beginning and the exact end of each frame.

When data frames are being transmitted through a sequence of stations in a network, it is necessary to compensate for timing difference between stations; these differences may arise because of frequency differences in the local clocks of the various stations on the network, physical variations in the transmission medium between stations and numerous other factors. If there is a timing difference between a transmitting station and a receiving station, then receiver data sampling for local use or repropagation of data characters on the network will drift, eventually causing data retrieval errors.

To accommodate these timing variations, each station in the network typically incorporates an elasticity buffer which causes received data characters to queue up before retransmission. The receiving station utilizes a clock recovered from the received data signal to write received data characters into its elasticity buffer and its own local read clock to sequentially retrieve the stored data characters from the elasticity buffer for retransmission in the order in which they were received.

An elasticity buffer is basically a cyclic buffer queue, that is, a series of sequentially accessed storage registers wherein access for a particular operation, i.e. write or read, returns or "wraps around" to the first register in the series after the last register in the series has been accessed for that operation. Write pointer logic, typically an incrementing counter, holds the address of the elasticity buffer storage register currently accessed for a write operation. Similarly, read pointer logic holds the address of the register currently accessed for a read operation.

In the case of a conventional elasticity buffer, the elasticity buffer's write pointer starts writing received data characters into the storage registers upon identification of an implicit or explicit start delimiter and stops advancing its write pointer after it has advanced beyond the storage register into which it has written the first character of the interframe gap. The elasticity buffer's read pointer starts reading data characters from the storage registers upon identification of a read-start signal and stops advancing, or "stalls", on the first character of the interframe gap. Thus, the reader "creates" as many additional interframe gap characters as it needs, regardless of the number that were received. Typically, the elasticity buffer stalls the read pointer upon identification of a frame preamble character. Then, when the next start delimiter is identified, the elasticity buffer begins sequentially reading storage registers from where it stalled.

Usually, the elasticity buffer circuitry that recognizes the start delimiter generates a "start detected" signal. After a delay and synchronization with the receiver's local byte clock, a "read-start" signal is in turn created that releases the read pointer to advance sequentially through the storage registers of the elasticity buffer. The delay allows data characters to accumulate in the elasticity buffer to ensure that even a station with the slowest allowable local clock that is receiving data from a transmitting station with the fastest allowable clock will not exhaust the elasticity buffer during receipt of the longest possible frame.

Some data transmission networks allow frames to be transmitted by the simultaneous cascaded transmission between stations of the multiple data characters comprising a frame via a plurality of transmission channels operating in tandem. Thus, in a network having N transmission channels between stations, a frame may be transmitted by placing the first data character in the frame sequence on the first channel, the second data character on the second channel and the Nth data character on the Nth channel, the initial data character on each channel being preceded by either an implicit or explicit start delimiter. Then, the N+1 data character is placed on the first channel, the N+2 data character is placed on the second channel and so on until all data characters in the frame are spread across the N channels.

There is no problem synchronizing the transmission of the multiple data characters over different channels, since the transmitting station's "local" clock can be used for timing each of the transmissions. However, as stated above, due to the different delays through the transmission media and the transmitter and receiver circuits, as well as frequency variations between the transmitting and receiving stations, synchronization problems for these cascaded, multi-channel serial transmissions can occur at the receiving station.

Thus, the receiving station must accurately reassemble all of the data characters that have been serially transmitted over the multiple channels utilizing the elasticity buffer associated with each channel and then simultaneously initiate retrieval of character-wide data from each channel's elasticity buffer in the exact sequence in which the data characters were received in order to accurately retransmit the frame.

To achieve this goal in a conventional multi-channel system, each channel is provided with an elasticity buffer to accomodate clock skew and synchronization followed by a separate first-in-first-out (FIFO) memory device to achieve alignment across the channels. Complex control logic in each channel starts copying data from its associated elasticity buffer when it detects a start delimiter. The host system begins reading the FIFOs when all FIFOs indicate that they are not empty. Additional throughput delay results because of the time required for the migration of the data through each FIFO.

It would, therefore, be highly desirable to have available a simple technique for cascading a number of receiver elasticity buffers while allowing simultaneous retrieval of character-wide data in the order that the data characters were received without utilizing external logic or lengthy FIFOs.

SUMMARY OF THE INVENTION

The present invention provides a method and apparatus for synchronizing the cascaded, multi-channel transmission of a plurality of data characters between stations in a network. The sequence of data characters transmitted on each channel is preceded by a start delimiter, which may be either implicit or explicit. Each channel provides the data characters transmitted on that channel to an associated elasticity buffer in the receiver station. As each elasticity buffer identifies a start delimiter, a begin-request signal is asserted indicating that a start delimiter has been identified on that channel. When all elasticity buffers have identified a start delimiter, that is, when all channels have asserted a begin-request signal indicating that a start delimiter has been identified, then a read-start signal is asserted which causes simultaneous release of the read pointer of each elasticity buffer for sequential advancement. In this manner, each elasticity buffer initiates a synchronized read for retrieval of a sequence of data characters in the order that the data characters were received.

Thus, in accordance with the present invention, the delay provided in conventional elasticity buffer's between recognition of a start delimiter and release of the elasticity buffer read pointer results in only a read pointer release request. An additional constraint is provided which requires that all other cascaded elasticity buffers also receive their release requests in order to generate the true release signal. This additional constraint allows the elasticity buffer to perform double duty: its normal elastic action to prevent loss of data due to minor differences between transmitter and receiver clocks and the additional FIFO action that holds up data that may have traversed a "faster" path until the data on all channels has arrived, thereby achieving data alignment across the channels.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

An illustrative embodiment of the synchronization method and apparatus of the present invention will be described below in the context of a data transmission network in accordance with the Fiber Distributed Data Interface (FDDI) Physical Layer protocol which has been configured for multi-channel transmissions to provide higher bandwidth than an FDDI network. It should be understood, however, that the concepts of the present invention are applicable to any multi-channel data transmission system.

The FDDI protocol is an American National Standards Institute (ANSI) data transmission standard which applies to a 100 Mbit per second token ring network that utilizes an optical fiber transmission medium. The FDDI protocol is intended as a high performance interconnection among computers as well as among computers and their associated mass storage subsystems and other peripheral equipment.

In an FDDI network, information is transmitted between stations in data frames that are separated by inter-frame gaps of control characters. Each frame consists of a sequence of 5-bit characters or "symbols", each symbol representing 4 data bits. Information is typically transmitted in symbol pairs or "bytes". Each frame is bounded by start and stop delimiters. A start code comprising a unique start delimiter byte JK identifies the exact beginning of a frame.

Additional information regarding the FDDI protocol is presented by Floyd E. Ross, "FDDI - an Overview", Digest of Papers, Computer Soc. Intl. Conf., Compcon '87, pp. 434-444, which is hereby incorporated by reference to provide additional background information for the present invention.

Figure 1:
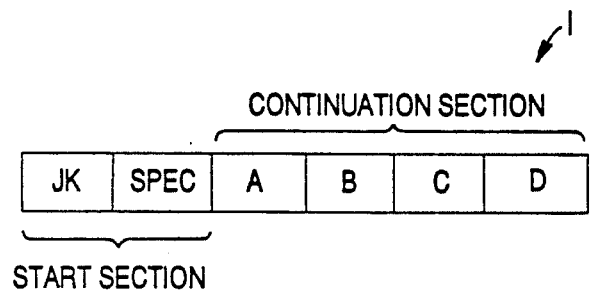
FIG. 1 is a block diagram illustrating an elasticity buffer architecture that is utilizable in conjunction with the synchronization method and apparatus of the present invention.

FIG. 1 shows a block diagram of an elasticity buffer 1 that may be utilized in practicing the present invention. As shown in FIG. 1, elasticity buffer 1 is divided into a START section and a CONTINUATION section. The START section includes two byte-wide registers: JK and SPEC. The CONTINUATION section defines a cyclic buffer queue, that is, a series of sequentially accessed byte-wide storage registers A-D wherein access for a particular operation, i.e. either write or read, wraps around to the first register A in the series after the last register D in the series has been accessed for that operation.

Write pointer logic (not shown) holds the address of the storage register in elasticity buffer 1 currently accessed for a write operation. Similarly, read pointer logic (not shown) holds the address of the storage register in elasticity buffer 1 currently being accessed for a read operation.

The write pointer of elasticity buffer 1 is set to the JK register in the START section when a start delimiter JK has been detected. The write pointer will then move through the SPEC register and into the CONTINUATION section. Once the write pointer is in the CONTINUATION section, it will remain there and write byte-wide data to registers A-D in a cyclical sequential fashion.

The read pointer of elasticity buffer 1 starts reading characters from the storage registers upon detecting a read-start signal. Characters are read in a manner similar to the way in which the write pointer writes, i.e. beginning in the JK register, across the two sections of the elasticity buffer and then in a cyclical sequential fashion in the CONTINUATION section, i.e., in registers A-D.

Since the write pointer has no knowledge of the read pointer's location and vice versa, the START section's SPEC register insures that the write pointer will not leave the START section until a read-start signal has been asserted, causing the read pointer to point to the JK register. The read pointer must then sequentially read the storage registers of the START section before it can enter the CONTINUATION section cyclic buffer queue.

As stated above, once the write pointer or the read pointer leaves the START section, it can only re-enter the START section upon detecting a subsequent start delimiter JK.

An elasticity buffer generally of the type described above is disclosed in U.S. Pat. application Ser. No. 338,587, SYMBOL-WIDE ELASTICITY BUFFER, filed Apr. 14, 1989 by Li et al and commonly assigned along with the present application to National Semiconductor Corporation, and which is hereby incorporated by reference to provide additional background information for the present invention. As indicated by the title of the referenced application, it describes an elasticity buffer having symbol-wide storage registers. The present invention is described in the context of an elasticity buffer having byte-wide storage registers.

Again, it should be noted that while the invention is described in the context of an elasticity buffer wherein a "read" is initiated at a preselected storage register, i.e. the start delimiter register JK, the concepts of the invention are equally applicable to those configurations that utilize a conventional elasticity buffer, e.g. an elasticity buffer that stalls the read pointer upon identification of a frame preamble character and then begins sequentially reading storage registers from where it stalled when a start delimiter is identified.

Figure 2:
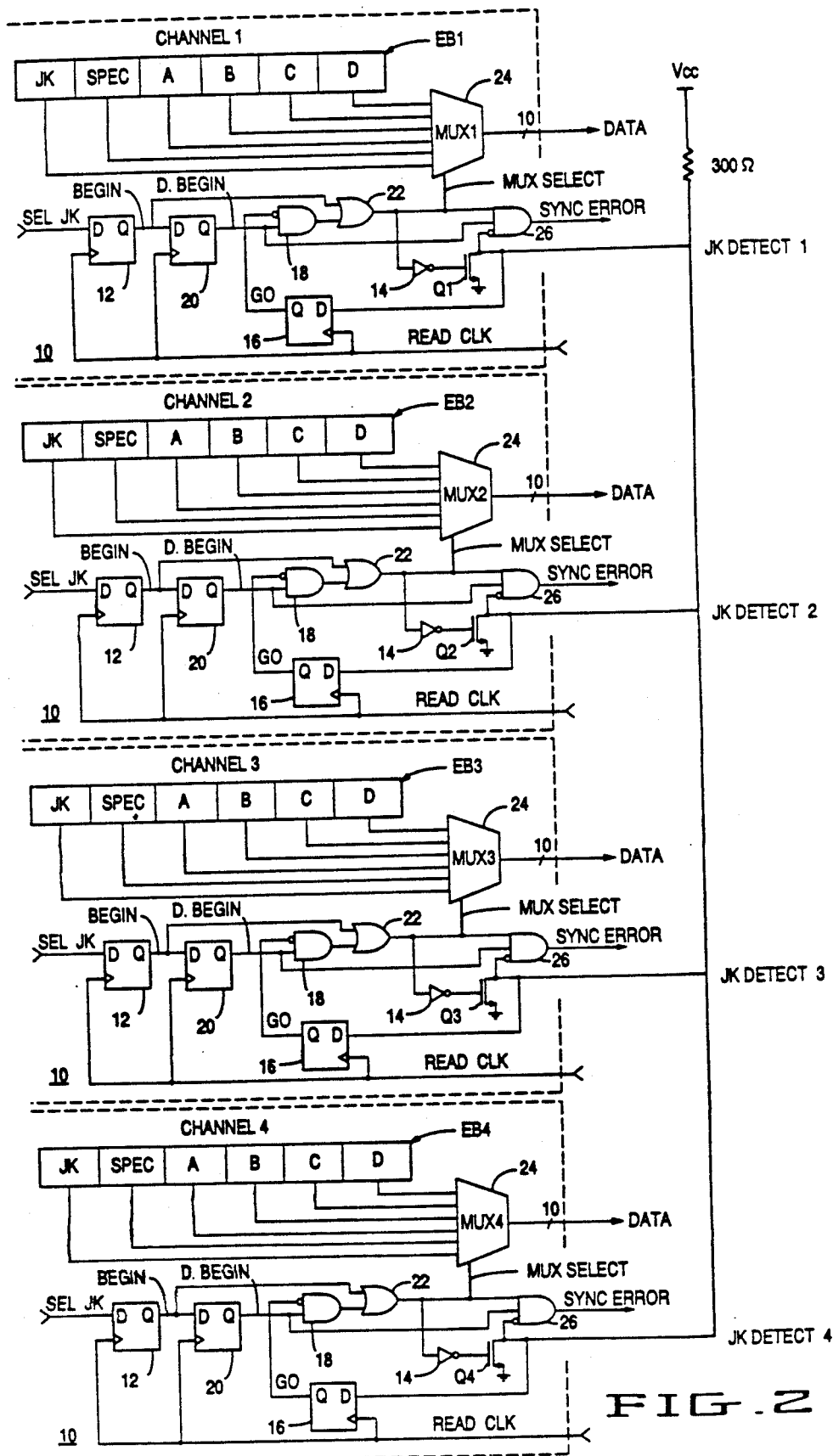
FIG. 2 is a schematic diagram illustrating an embodiment of the present invention that utilizes open drain driver circuitry for generating a synchronized elasticity buffer read-start signal in accordance with the present invention.

FIG. 2 shows an embodiment of a data character retrieval system in accordance with the present invention which utilizes open drain driver circuitry 10 associated with each of four channels 1-4 to provide synchronized retrieval of byte-wide data characters from elasticity buffers EB1-EB4.

The data character received on the 4 channels may represent either parallel transmission of separate frames on each of the individual channels, each frame being preceded by a JK start delimiter, or cascaded serial transmission of the sequential data characters of a single frame spread across the 4 parallel channels, the first data character of a frame transmitted on each channel being preceded by a JK start delimiter.

As shown in FIG. 2, as the receiver station identifies receipt of a start delimiter byte JK from the network transmission medium on one of its channels, it asserts signal SEL.JK to driver circuitry 10 associated with that channel. Driver circuitry 10 responds to the SEL.JK signal by asserting a begin-request signal BEGIN via flip-flop 12 to one of the inputs of OR gate 18, causing the output of OR gate 18 to go high. The output of OR gate 18 is applied to the gate of an open drain n-channel transistor via an inverter 14. (It will be recognized by those skilled in the art that, consistent with the principles of the present invention, open collector bipolar transistors can be substituted for the open drain n-channel transistors Q1-Q4.) Thus, assertion of the begin-request signal BEGIN on a particular channel causes the open drain transistor associated with that channel to turn off. Assertion of the BEGIN signal on a particular channel also causes the MUX SELECT signal to set the read pointer of that channel's elasticity buffer to the JK register.

As further shown in FIG. 2, the outputs of the open drain transistors Q1-Q4 associated with channels 1-4 are connected in a wired-AND configuration. Thus, when all four driver circuits 10 have received a start delimiter JK, all of the open drain transistors Q1-Q4 are off, causing the wired-AND configuration to simultaneously bring each of the JK.DETECT1-JK.DETECT4 signals high. The JK.DETECT1-JK.DETECT4 signals are, thus, simultaneously applied to the D input of an associated flip-flop 16 on the next cycle of the receive station's read clock signal READ CLK. This results in the simultaneous assertion by each flip-flop 16 of a read-start signal GO at the Q output of flip-flop 16. The same cycle of the read clock signal READ.CLK that causes the flip-flop 16 in each channel to assert the GO signal also causes the receipt of the start delimiter JK to be acknowledged by assertion of the D.BEGIN signal at one of the inputs of AND gate 18, flip-flop 20 having provided a one cycle delay. The second input to AND gate 18 is the inverse of the Q output of flip-flop 16. The output of AND gate 18 and the Q output of flip-flop 12 provide the inputs to OR gate 22. Thus, the driver circuitry 10 of each channel causes its associated multiplexor 24 to simultaneously provide the contents of the JK register as its 10-bit parallel output when the following signals are asserted: BEGIN or (D.BEGIN.$\overline{GO}$). The driver circuitry 10 of each channel 1-4 then simultaneously advances the read pointer of each elasticity buffer EB1-EB4 from the JK register to the SPEC register upon assertion of the JK.DETECT signal in each channel, and then sequentially into the CONTINUATION section.

In this manner, each elasticity buffer EB1-EB4 initiates a synchronized sequential read of byte-wide data characters DATA via multiplexor 24.

It will be recognized by those skilled in the art that while the invention is described above in the context of a "wired-AND" configuration, which is a component and I/O pin saving mechanism, the wired-AND configuration is certainly not essential to implementation of the present invention. For example, by separating each of the JK-DETECT signal outputs from the D input of its associated flip-flop 16 and inserting a physical AND gate, the output of the physical AND gate would provide the drive signal to the D input of the flip-flops 16 that generate the GO signals. In fact, when cascading more than four channels at 100MHz, the parasitic capacitances of the wired-AND configuration render it potentially unworkable, whereas the physical AND gate implementation allows up to eight channels to be cascaded more readily. The disadvantages of the physical AND gate approach are the increase in traces on the board, the additional component count and the additional pin on each device, the latter because the JK-DETECT signal and the D input of the flip-flop must be brought off the chip on separate pins.

As further shown in FIG. 2, if not all channels 1-4 turn off their respective open drain transistors Q1-Q4 within two cycles of the receive station's read clock signal READ.CLK after the first start delimiter JK is received, a SYNC.ERROR flag is asserted via AND gate 26. That is, the signal SYNC.ERROR is asserted when the D.BEGIN and MUX.SELECT signals are all simultaneously asserted by the drive circuitry 10 and the JK.DETECT signal has not yet been asserted, indicating that not all channels have received a JK start delimiter.

It should be noted that a mechanism would be provided for defeating the cascading action described above for normal FDDI operation.

It should be understood that various alternatives to the embodiment of the invention described herein may be utilized in practicing the invention. It is intended that the following claims define the scope of the invention and that devices within the scope of these claims and their equivalents be covered thereby.

What is claimed is:

1. In a data transmission network wherein information frames are serially transmitted between a transmitter station and a receiver station via a plurality of transmission channels, an information frame comprising a sequence of 10-bit bytes preceded by a start delimiter byte, each of the plurality of transmission channels providing bytes transmitted on that channel for storage in sequentially addressable byte-wide storage registers of an associated elasticity buffer, the elasticity buffer including read pointer means for addressing the storage register from which a stored byte is to be retrieved, the receiver station including a plurality of driver circuits, one such driver circuit being associated with each transmission channel, a method of simultaneously initiating retrieval of bytes from each of the elasticity buffers in the same sequence in which the bytes were stored, the method comprising:
    (a) setting the read pointer means of the elasticity buffer of an associated transmission channel to address a preselected storage register upon detection of the start delimiter byte on that channel;
    (b) asserting a begin-request signal indicating that a start delimiter byte has been detected on that transmission channel;
    (c) setting the read pointer to address the next sequential storage register after the preselected storage register upon receipt by the driver circuit of the associated transmission channel of a read-start signal; and
    (d) providing the begin-request signal to the base of an open drain transistor, one such transistor being associated with each driver circuit, the outputs of the open drain transistor being connected in a wired-AND configuration such that when all of the driver circuits have detected a start delimiter byte, all of the open drain transistors simultaneously turn off, thereby simultaneously asserting a read-start signal to each of the driver circuits.

2. In a data transmission network wherein a plurality of sequences of multi-bit information characters are transmitted from a transmitter station to a receiver station via a plurality of transmission channels, each sequence of multi-bit information characters to be transmitted on a corresponding transmission channel being preceded by a start delimiter, each of the plurality of transmission channels providing the multi-bit information characters transmitted on that channel to be sequentially written into sequentially accessible storage locations of an associated storage element included in the receiver, each storage element including read pointer means for accessing a storage location from which a multi-bit information character is to be retrieved, synchronization circuitry for simultaneously initiating sequential retrieval of multi-bit information characters from each of the storage elements in the same sequence in which the multi-bit information characters were written into that storage element, the synchronization circuitry comprising:
    (a) a plurality of driver circuits, one such driver circuit associated with each transmission channel, each driver circuit comprising:
        (i) detection means responsive to detection of a start delimiter for asserting a begin-request signal; and
        (ii) start means responsive to receipt of a read-start signal for releasing the read pointer to retrieve data characters from a selected storage location of the associated storage element; and
    (b) begin means responsive to simultaneous assertion of a begin-request signal by all driver circuits for simultaneously providing a read-start signal to each storage element;
    whereby the read pointer of each storage element is simultaneously released to retrieve multi-bit information characters from the associated storage element.

3. Circuitry as in claim 2 wherein each driver circuit includes means for generating a synchronization error signal if each driver circuit has not received a read-start signal within a preselected time after detection of a start delimiter by one of the driver circuits.

4. In a data transmission network wherein sequences of 10-bit information bytes are transmitted between a transmitter station and a receiver station via a plurality of transmission channels, each sequence of information bytes being preceded by a start delimiter byte, each of the plurality of transmission channels providing information bytes transmitted on that channel for storage in sequentially addressable, byte-wide storage registers of an associated elasticity buffer, the elasticity buffer including read pointer means for addressing the storage register from which a stored information byte is to be retrieved, circuitry for simultaneously initiating retrieval of information bytes from each of the elasticity buffers in the same sequence in which the information bytes were stored, the circuitry comprising:
    (a) a plurality of driver circuits, one such driver circuit associated with each transmission channel, each driver circuit comprising:
        (i) means responsive to detection of a start delimiter byte for both setting the read pointer means of the elasticity buffer of the associated transmission channel to address a preselected storage register in that elasticity buffer and asserting a begin-request signal indicating that a start delimiter byte has been detected by that driver circuit; and
        (ii) means responsive to receipt of a read-start signal for setting the read pointer to address the next sequential storage register in that elasticity buffer after the preselected storage register; and
    (b) a plurality of open drain transistors, one such transistor associated with each driver circuit and having its gate connected to receive the begin-request signal to turn off such transistor, the outputs of the open drain transistors being connected in a wired-AND configuration such that when all of the driver circuits have detected a start delimiter byte, causing all of the open drain transistors to simultaneously turn off, a read-start signal is simultaneously asserted to each of the driver circuits.

5. In a data transmission network wherein a plurality of information frames are transmitted from a transmitter station to a receiver station via a plurality of transmission channels, an information frame comprising a sequence of multi-bit information characters preceded by a start delimiter, each of the plurality of transmission channels providing multi-bit information characters transmitted on that channel for storage in sequentially accessibly storage locations of an associated storage element included in the receiver station, the storage element including read pointer means for accessing a selected storage location from which a stored information character is to be retrieved, a method of simultaneously initiating retrieval of multi-bit information characters from each of the storage elements in the same sequence in which the multi-bit information characters were stored in that storage element, the method comprising:

(a) setting the read pointer means of the storage element of the associated transmission channel to access a preselected storage location upon detection by the receiver station of a start delimiter on that transmission channel;

(b) for each transmission channel, asserting a begin-request signal indicating that the receiver station has detected receipt of a start delimiter on that transmission channel;

(c) simultaneously providing a read-start signal to each storage element upon simultaneous assertion of a begin-request signal for each of the transmission channels; and (d) for each transmission channel, setting the read pointer of that transmission channel's storage element to access the next sequential storage location after the preselected storage location upon receipt of a read-start signal by that transmission channel's storage element, whereby the read pointer of each storage element is simultaneously released to access the next sequential storage location of the associated storage element.

6. A method as in claim 5 and further including the step of generating a synchronization error signal if each storage element does not detect a read-start signal within a preselected time after detection of a start delimiter on one of the channels.

* * * * *